US010041506B2

(12) United States Patent
Zhang et al.

(10) Patent No.: US 10,041,506 B2
(45) Date of Patent: Aug. 7, 2018

(54) SYSTEM FOR DISCHARGING COMPRESSED AIR FROM A COMPRESSOR

(71) Applicant: General Electric Company, Schenectady, NY (US)

(72) Inventors: Hua Zhang, Greer, SC (US); James Frederik den Outer, Simpsonville, SC (US); Mark Edward Heavner, Simpsonville, SC (US); Mark Patrick Hayes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 14/755,429

(22) Filed: Jun. 30, 2015

(65) Prior Publication Data

US 2017/0002831 A1    Jan. 5, 2017

(51) Int. Cl.
*F04D 29/54* (2006.01)
*F01D 21/16* (2006.01)
(Continued)

(52) U.S. Cl.
CPC ........... *F04D 29/545* (2013.01); *F01D 21/16* (2013.01); *F01D 25/04* (2013.01); *F02C 9/18* (2013.01); *F04D 19/00* (2013.01); *F04D 25/045* (2013.01); *F04D 27/0207* (2013.01); *F05D 2260/605* (2013.01); *F05D 2260/83* (2013.01); *F05D 2260/85* (2013.01); *F05D 2260/96* (2013.01); *F05D 2270/091* (2013.01)

(58) Field of Classification Search
CPC .. F04D 25/045; F04D 27/0207; F04D 29/545; F01D 21/16; F02C 9/18
See application file for complete search history.

(56) References Cited

U.S. PATENT DOCUMENTS

| | | | |
|---|---|---|---|
| 4,113,050 A | * | 9/1978 | Smith ..................... F01N 1/083 138/41 |
| 5,156,177 A | | 10/1992 | Bishoff |
| (Continued) | | | |

FOREIGN PATENT DOCUMENTS

| | | |
|---|---|---|
| GB | 2492849 A | 1/2013 |
| WO | 2014/134134 A1 | 9/2014 |

OTHER PUBLICATIONS

Extended European Search Report and Opinion issued in connection with corresponding EP Application No. 16176134.1 dated Dec. 7, 2016.

*Primary Examiner* — Woody Lee, Jr.
(74) *Attorney, Agent, or Firm* — Dority & Manning, P.A.

(57) ABSTRACT

A system for discharging compressed air from a compressor includes a air distribution manifold that is in fluid communication with the compressor via a conduit and at least one discharge line that is in fluid communication with the air distribution manifold. The discharge line defines a flow path from the air distribution manifold to atmosphere. The discharge line comprises a coupling pipe that is coupled to the air distribution manifold, a sparger section that is disposed downstream from the coupling pipe and at least one restrictor plate that is disposed between the coupling pipe and the sparger section within the flow path. The restrictor plate comprises at least one aperture that provides a pressure drop of the compressed air between the air distribution manifold and the sparger section.

15 Claims, 4 Drawing Sheets

(51) Int. Cl.
  *F01D 25/04* (2006.01)
  *F04D 27/02* (2006.01)
  *F02C 9/18* (2006.01)
  *F04D 19/00* (2006.01)
  *F04D 25/04* (2006.01)

(56) References Cited

U.S. PATENT DOCUMENTS

| | | | | |
|---|---|---|---|---|
| 5,166,479 | A * | 11/1992 | Gras | F01D 25/02 |
| | | | | 181/256 |
| 2005/0029361 | A1* | 2/2005 | Catron | B01F 5/0453 |
| | | | | 239/1 |
| 2014/0182307 | A1* | 7/2014 | Ponnuraj | F02C 9/18 |
| | | | | 60/785 |
| 2015/0361902 | A1* | 12/2015 | Napier | F02C 9/18 |
| | | | | 60/785 |

* cited by examiner

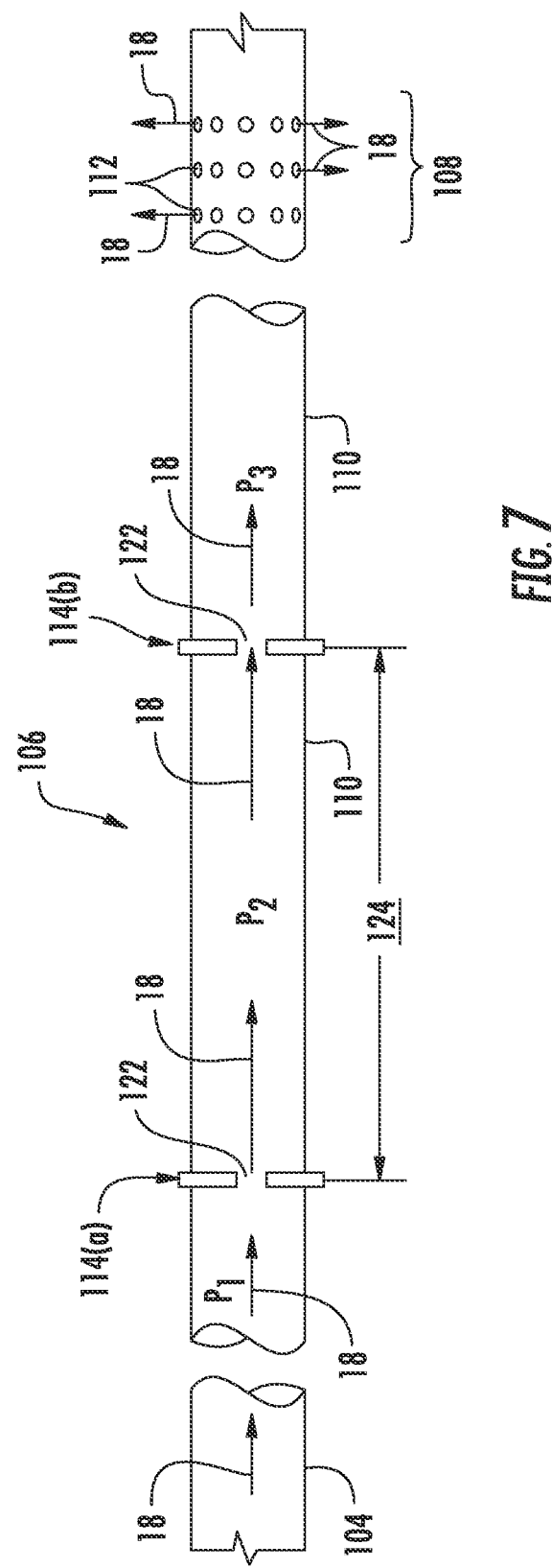

SYSTEM FOR DISCHARGING COMPRESSED AIR FROM A COMPRESSOR

FIELD OF THE INVENTION

The present invention generally relates to a gas turbine. More particularly, this invention relates to a system for discharging compressed air from a compressor of a gas turbine.

BACKGROUND OF THE INVENTION

A gas turbine generally includes an inlet section, a compressor section, a combustion section, a turbine section and an exhaust section. The inlet section cleans and conditions a working fluid (e.g., air) and supplies the working fluid to the compressor section. The compressor section progressively increases the pressure of the working fluid and supplies a compressed working fluid to the combustion section. The compressed working fluid and a fuel are mixed within the combustion section and burned in a combustion chamber to generate combustion gases having a high temperature and pressure. The combustion gases are routed along through a hot gas path into the turbine section where they expand to produce work. For example, expansion of the combustion gases in the turbine section may rotate a shaft connected to a generator to produce electricity.

The compressed air provided by the compressor may reach pressures in excess of 300 psig. In particular instances, such as startup of the gas turbine, operation on low heating fuel, or using the compressor as a load in a gas turbine testing facility, it becomes necessary to wholly or at least partially dump or exhaust the compressed air from the compressor and/or a combustion discharge casing that is disposed downstream from the compressor and upstream from the turbine as required by the gas turbine operations.

Various venting systems are known. However, the release of a large quantity of the highly pressurized compressed air to atmospheric pressure creates a situation where a high level of energy needs to be dissipated in a limited size venting system, which may cause vibrations. These vibrations may result in high cycle fatigue stress on the various components of the vent systems. Therefore, an improved system for discharging compressor air from the compressor would be useful.

BRIEF DESCRIPTION OF THE INVENTION

Aspects and advantages of the invention are set forth below in the following description, or may be obvious from the description, or may be learned through practice of the invention.

One embodiment of the present invention is a system for discharging compressed air from a compressor. The system includes a air distribution manifold that is in fluid communication with the compressor via a conduit and at least one discharge line that is in fluid communication with the air distribution manifold. The discharge line defines a flow path from the air distribution manifold to atmosphere. The discharge line comprises a coupling pipe that is coupled to the air distribution manifold, a sparger section that is disposed downstream from the coupling pipe and at least one restrictor plate that is disposed between the coupling pipe and the sparger section within the flow path. The restrictor plate comprises at least one aperture that provides a pressure drop of the compressed air between the air distribution manifold and the sparger section.

Another embodiment of the present invention is a system for discharging compressed air from a compressor of a gas turbine. The system includes a air distribution manifold that is in fluid communication with the compressor via a conduit that is coupled to the gas turbine upstream from a turbine of the gas turbine. A discharge line is in fluid communication with the air distribution manifold and defines a flow path from the air distribution manifold to atmosphere. The discharge line comprises a coupling pipe that is coupled to the air distribution manifold, a sparger section that is disposed downstream from the coupling pipe and at least one restrictor plate that is disposed between the coupling pipe and the sparger section within the flow path. The restrictor plate comprises at least one aperture that provides a pressure drop of the compressed air between the air distribution manifold and the sparger section.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 7 is a simplified schematic view of a portion of the system as shown in FIGS. 1, 2 and 3 according to one embodiment of the present invention.

DETAILED DESCRIPTION OF THE INVENTION

Figure 1:
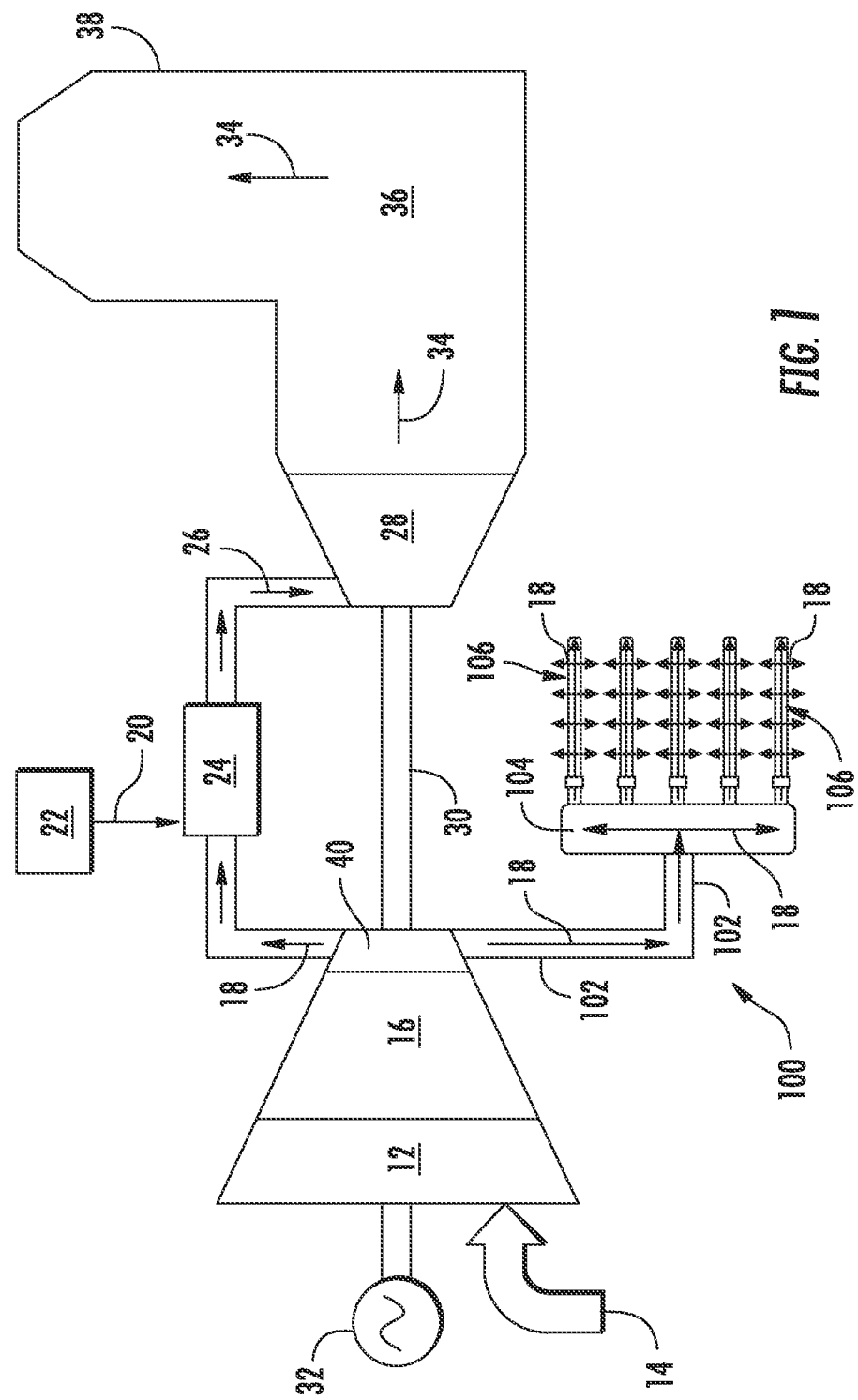
FIG. 1 is a functional block diagram of an exemplary gas turbine including a system for discharging compressed air from a compressor according to at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a system for discharging compressed air from a land based power generating gas turbine for purposes of illustration, one of ordinary skill in the art will readily appreciate that embodiments of the present invention may be applied to any style or type of compressed air driven turbomachine and are not limited to land based power generating gas turbines unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition air 14 or other working fluid entering the gas turbine 10. The air 14 flows to a compressor section where a compressor 16 progressively imparts kinetic energy to the air 14 to produce compressed air 18.

The compressed air 18 is mixed with a fuel 20 from a fuel supply system 22 to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Depending on the operational mode of the gas turbine 10, the compressed air 18 may exceed about 300 psig and about 1000° F. at an outlet of the compressor. The compressed air 18 is typically routed from the compressor outlet into a compressor discharge casing 40 that surrounds various combustor components. In particular instances, such as startup of the gas turbine, operation using low heating fuel, or when using compressor as a load in a gas turbine testing facility, it becomes necessary to wholly or at least partially dump or exhaust the compressed air from the compressor and/or a combustion discharge casing that is disposed downstream from the compressor and upstream from the turbine to atmosphere as required by the gas turbine operations.

Figure 2:
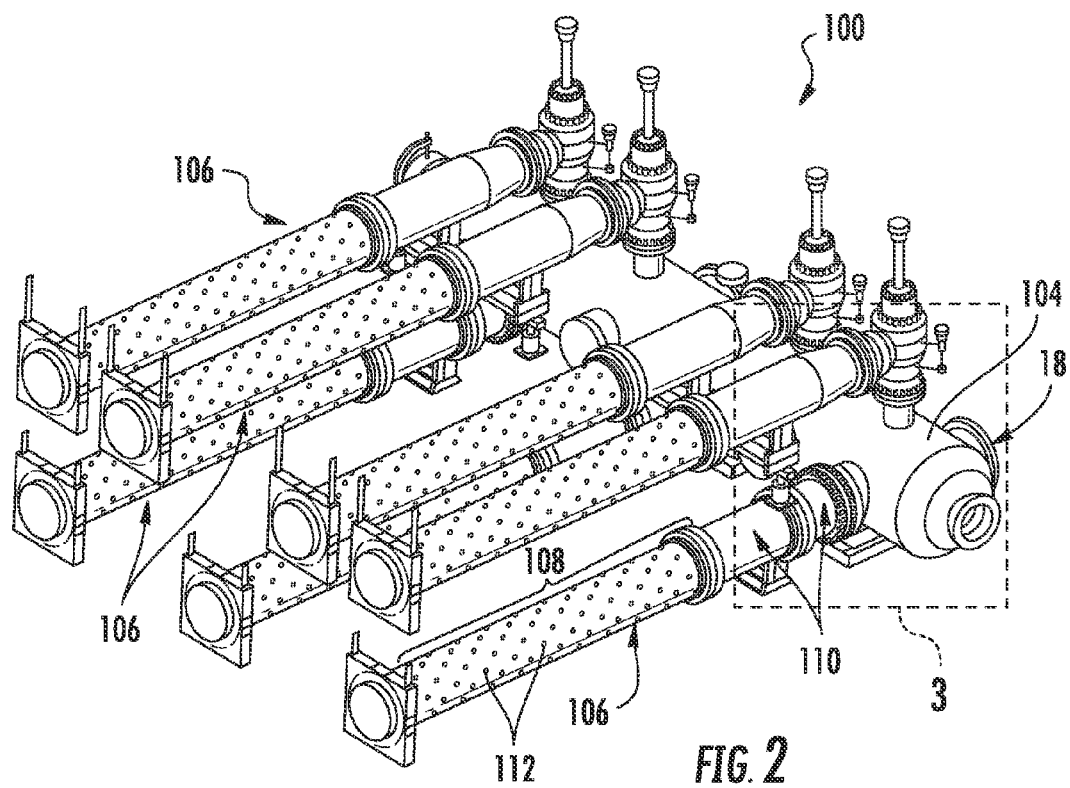
FIG. 2 is a perspective view of an exemplary system for discharging compressed air from a compressor according to at least one embodiment of the present invention.
Figure 3:
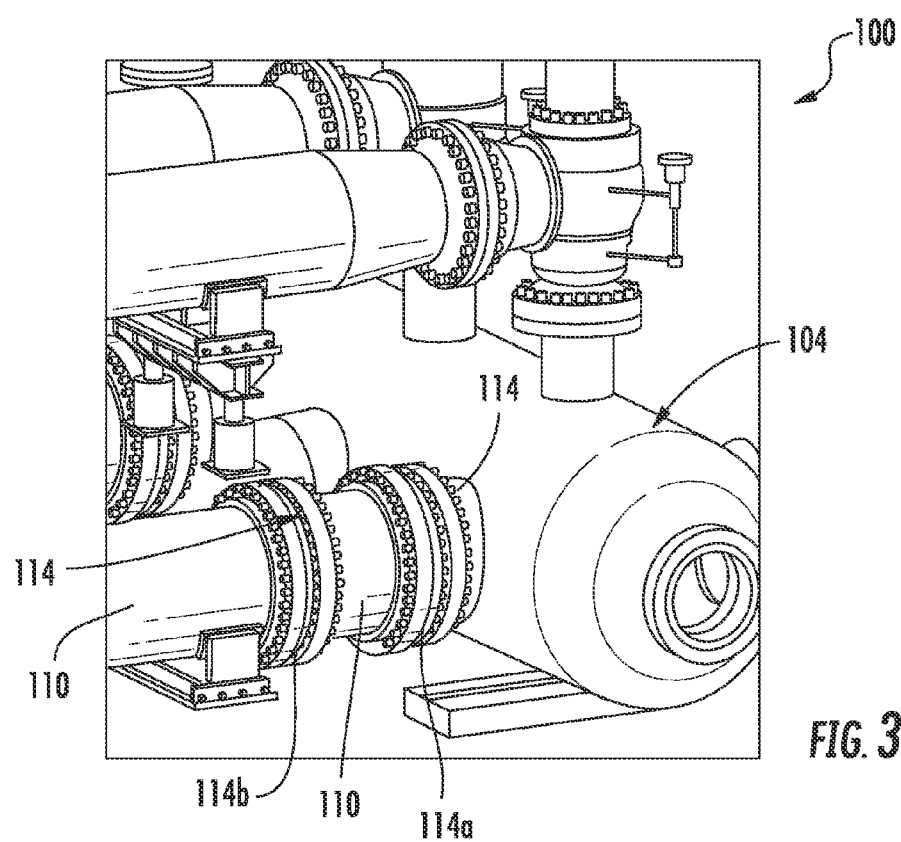
FIG. 3 is a partial perspective view of the system for discharging compressed air from a compressor as shown in FIG. 2, according to at least one embodiment of the present invention.

In various embodiments, as shown in FIGS. 1, 2 and 3, a system 100 for discharging the compressed air 18 from the compressor 16 and/or the compressor discharge casing 40, herein referred to as "system" is fluidly coupled to the gas turbine 10. For example, as shown in FIG. 1, the system 100 may include various fluid couplings and/or conduits 102 that define one or more flow path(s) for routing the compressed air 18 between the compressor 16 and/or the compressor discharge casing 40 to an air distribution manifold 104 of the system 100.

In various embodiments, as shown in FIGS. 1 and 2, the system 100 includes at least one discharge line 106 in fluid communication with the air distribution manifold 104. In various configurations, as illustrated in FIGS. 1 and 2, the system 100 includes a plurality of horizontally extending discharge lines 106. As shown in FIG. 2, the discharge line 106 generally includes a sparger section 108 that is coupled to the air distribution manifold 104 via one or more coupling pipes 110. The sparger section 108 defines a plurality of exhaust ports 112 defined along the span of the sparger section 108. The discharge line(s) 106 define(s) a flow path form the air distribution manifold 104 to atmosphere.

In operation, such as during a trip event of the gas turbine, various valves may be actuated thus allowing the compressed air 18 to flow from the compressor 16 and/or the compressor discharge casing 40 into the air distribution manifold 104. The compressed air 18 flows out of the air distribution manifold 104 through the coupling pipes 110 and into the sparger section 108. The compressed air 18 then flows through the exhaust ports 112 to the surrounding atmosphere. The exhaust ports 112 significantly reduce the pressure of the compressed air before it is released to the atmosphere. However, the sudden release of the relatively high pressure compressed air 18 to atmospheric pressure results in high levels of energy which induce vibration in the discharge line 106, particularly in the sparger section 108. In various embodiments, as shown in FIG. 3, at least one discharge line 106 includes at least one restrictor plate 114 disposed upstream from the sparger section 108 and downstream from the air distribution manifold 104.

Figure 4:
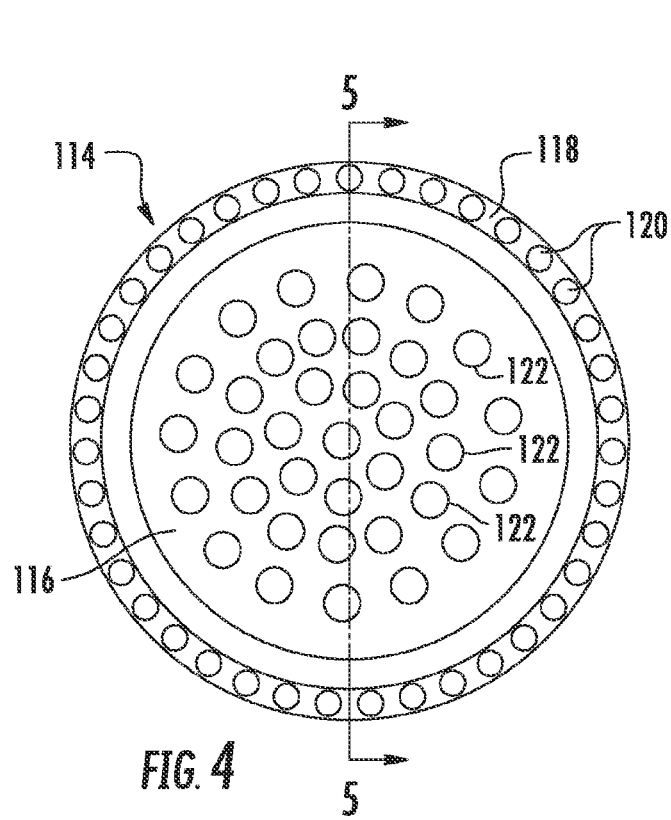
FIG. 4 is a downstream view of an exemplary restrictor plate according to at least one embodiment of the present invention.
Figure 5:
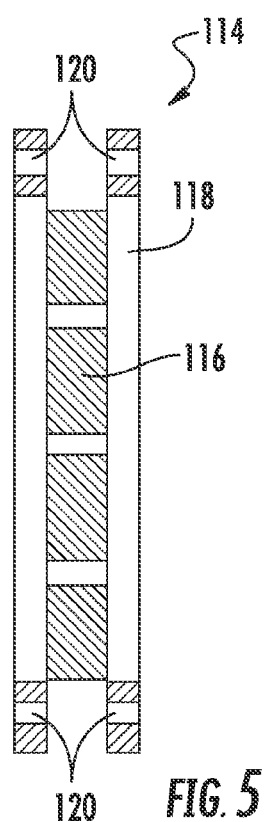
FIG. 5 is a cross sectional view of the restrictor plate as shown in FIG. 4 taken along section line 5-5.
Figure 6:
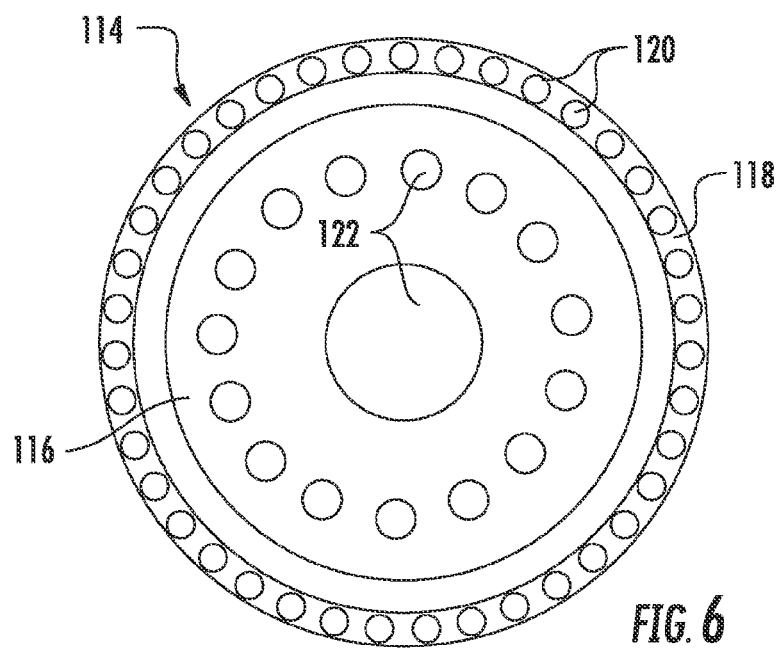
FIG. 6 is a downstream view of an exemplary restrictor plate according to at least one embodiment of the present invention.

FIG. 4 provides downstream view of an exemplary restrictor plate 114 according to one embodiment of the present disclosure. FIG. 5 provides a cross sectional side view of the flow restrictor plate 114 as shown in FIG. 4 taken along section line 5-5. FIG. 6 provides a downstream view of an exemplary restrictor plate according to one embodiment of the present invention. As shown in FIGS. 4, 5 and 6, the restrictor plate 114 generally includes a plate or plate portion 116 and a flange of flange portion 118. The flange portion 118 may include a plurality of circumferentially arranged bolt holes 120.

In various embodiments, the plate portion 116 defines at least one orifice or aperture 122 that provides for fluid flow through the plate portion 116. In various embodiments, the plate portion 116 defines a plurality of apertures 122. Although shown as generally round, the apertures 122 may have any shape such as ovular, elliptical, triangular, square or rectangular. In particular embodiments, as shown in FIG. 4, the apertures 122 may be sized substantially equally across the plate portion 116. In particular embodiments, the apertures 122 may have different diameters.

In particular embodiments, as shown in FIG. 3, the system 100 includes a first restrictor plate 114(a) disposed upstream from a second restrictor plate 114(b) which is disposed upstream from the sparger section 108. The diameter of the apertures 122 and the total number of apertures 122 in each corresponding restrictor plate 114(a) and 114(b) may be chosen so that a first amount or level of acoustical energy that is related to the form of a first pressure drop $\Delta P_1$ divided by $P_1$ through the first restrictor plate 114(a) is substantially equal to a second amount or level of acoustical energy that is related to the form of a second pressure drop $\Delta P_2$ divided by $P_2$ through the second restrictor plate 114(*b*).

For example, as shown schematically in FIG. 7, the compressed air 18 will flow from the air distribution manifold 104 (FIG. 1) into the discharge line 106 at a first pressure $P_1$. As the compressed air 18 flows through the apertures 122(*a*) of the first restrictor plate 114(*a*), the pressure will drop to a second pressure $P_2$. The compressed air 18 will then flow an axial distance 124 within the coupling pipe 110. The compressed air 18 then flows through the apertures 122(*b*) of the second restrictor plate 114(*b*) and the pressure within the discharge line 106 will drop a second time from $P_2$ to a third pressure $P_3$.

The compressed air 18 may then flow into the sparger section 108 (FIG. 2) where it is exhausted to atmosphere via the exhaust ports 112. By stepping down the pressure of the compressed air 18 flowing through the discharge line 106 upstream from the sparger section 108, more importantly such stepping down in pressure of multiple stage restrictors is not equally by pressure itself rather according to their ability to handle the acoustical energy, high level acoustical energy typically generated by the otherwise high pressure compressed air 18 flowing directly from the air distribution manifold 104 to the sparger section 108 and through the exhaust ports 112 to the ambient pressure may be substantially reduced. As a result, high cycle fatigue, particularly along the sparger section 108 may be reduced, thus enhancing the mechanical life of the discharge lines 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A system for discharging compressed air from a compressor, comprising:
   an air distribution manifold in fluid communication with the compressor via a conduit;
   a discharge line in fluid communication with the air distribution manifold, the discharge line defining a flow path from the air distribution manifold to atmosphere, the discharge line comprising a coupling pipe coupled to the air distribution manifold, a sparger section disposed downstream from the coupling pipe;
   a first restrictor plate disposed between the coupling pipe and the sparger section within the flow path, wherein the first restrictor plate comprises a first aperture having a first diameter, wherein the first aperture provides a first pressure drop of the compressed air between the air distribution manifold and the sparger section; and
   a second restrictor plate disposed downstream from the first restrictor plate and upstream from the sparger section, wherein the second restrictor plate comprises a second aperture having a second diameter different from the first diameter, wherein the second aperture provides a second pressure drop of the compressed air between the first restrictor plate and the sparger section.

2. The system as in claim 1, wherein the first aperture of the first restrictor plate is one of a first plurality of apertures and the second aperture of the second restrictor plate is one of a second plurality of apertures and wherein the first plurality of apertures comprises a first total number of apertures and the second plurality of apertures comprises a second total number of apertures different from the first total number of apertures.

3. The system as in claim 2, wherein the first plurality of apertures of the first restrictor plate are sized to provide the first pressure drop associated with a first level of acoustical energy within the flow path upstream from the second restrictor plate and the second plurality of apertures of the second restrictor plate are sized to provide the second pressure drop associated with a second level of acoustical energy within the flow path upstream from the sparger section.

4. The system as in claim 3, wherein the first pressure drop and the second pressure drop are not equal.

5. The system as in claim 3, wherein the acoustical energy level associated with the first pressure drop and the acoustical energy level associated with the second pressure drop are substantially equal.

6. The system as in claim 1, wherein the sparger comprises a plurality of exhaust ports, wherein the exhaust ports provide for fluid communication from the flow path to atmosphere.

7. The system as in claim 1, wherein the conduit is coupled to a compressor discharge casing disposed downstream from the compressor.

8. The system as in claim 1, wherein the discharge line is one of a plurality of discharge lines in fluid communication with the air distribution manifold and defining flow paths from the air distribution manifold to atmosphere, each discharge line comprising a coupling pipe coupled to the air distribution manifold and a sparger section disposed downstream from the coupling pipe.

9. A system for discharging compressed air from a compressor of a gas turbine, comprising:
   a air distribution manifold in fluid communication with the compressor via a conduit coupled to the gas turbine upstream from a turbine of the gas turbine;
   a discharge line in fluid communication with the air distribution manifold, the discharge line defining a flow path from the air distribution manifold to atmosphere, the discharge line comprising a coupling pipe coupled to the air distribution manifold, a sparger section disposed downstream from the coupling pipe;
   a first restrictor plate disposed between the coupling pipe and the sparger section within the flow path, wherein the restrictor plate comprises a first aperture having a first diameter, wherein the first aperture provides a first pressure drop of the compressed air between the air distribution manifold and the sparger section; and
   a second restrictor plate disposed downstream from the first restrictor plate and upstream from the sparger section, wherein the second restrictor plate comprises a second aperture having a second diameter different from the first diameter, wherein the second aperture provides a second pressure drop of the compressed air between the first restrictor plate and the sparger section.

10. The system as in claim 9, wherein the first aperture of the first restrictor plate is one of a first plurality of apertures and the second aperture of the second restrictor plate is one of a second plurality of apertures and wherein the first plurality of apertures comprises a first total number of apertures and the second plurality of apertures comprises a second total number of apertures different from the first total number of apertures.

11. The system as in claim 10, wherein the first plurality of apertures of the first restrictor plate are sized to provide the first pressure drop associated with a first level of acoustical energy within the flow path upstream from the second restrictor plate and the second plurality of apertures of the second restrictor plate are sized to provide the second pressure drop associated with a second level of acoustical energy within the flow path upstream from the sparger section.

12. The system as in claim 11, wherein the acoustical energy level associated with the first pressure drop and the acoustical energy level associated with the second pressure drop are substantially equal.

13. The system as in claim 9, wherein the sparger comprises a plurality of exhaust ports, wherein the exhaust ports provide for fluid communication from the flow path to atmosphere.

14. The system as in claim 9, wherein the gas turbine includes a compressor discharge casing downstream from the compressor, wherein the conduit is coupled to the compressor discharge casing.

15. The system as in claim 9, wherein the discharge line is one of a plurality of discharge lines in fluid communication with the air distribution manifold and defining flow paths from the air distribution manifold to atmosphere, each discharge line comprising a coupling pipe coupled to the air distribution manifold and a sparger section disposed downstream from the coupling pipe.

\* \* \* \* \*